June 4, 1963  O. S. GRAY  3,092,503
METHOD AND APPARATUS FOR STERILIZING
Filed Aug. 30, 1960
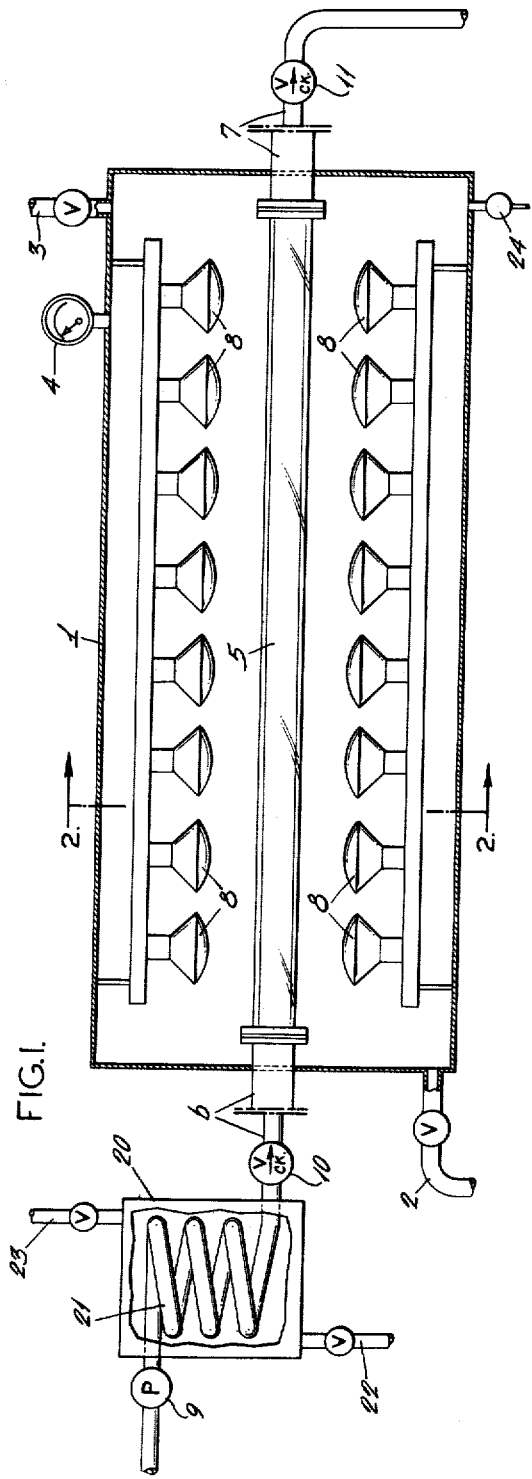
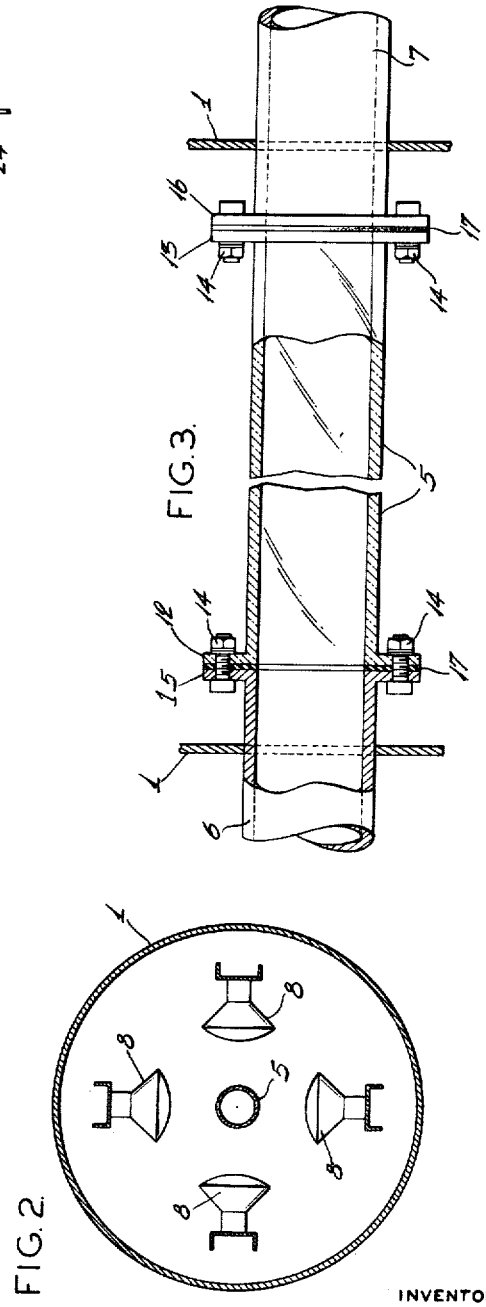
INVENTOR:
OSCAR S. GRAY
BY
Howson & Howson
ATTYS.

United States Patent Office 3,092,503
Patented June 4, 1963

3,092,503
METHOD AND APPARATUS FOR STERILIZING
Oscar S. Gray, West Fork, Ind.
Filed Aug. 30, 1960, Ser. No. 52,979
21 Claims. (Cl. 99—217)

The present invention relates to a novel method of sterilizing perishable materials and to novel apparatus therefor; and, more particularly, the present invention relates to a novel method and apparatus for sterilizing perishable materials without producing the disadvantages of prior known sterilization methods and equipment.

The sterilization of perishable liquids, like milk, juices, beer, soup, and the like, has been the subject of much investigation over recent years. The two principal means that have been suggested involve either the use of chemicals or the use of heat, or a combination of these. The use of chemicals for sterilization of edible liquids is not only impractical due to the objectionable taste imparted but is also prohibited with certain liquids, like milk. The use of heat to sterilize (as distinguished from pasteurization) such perishable liquids has not achieved commercial importance due principally to the fact that the temperatures required to produce a sterile product also cause deleterious alterations in the material undergoing sterilization treatment resulting in objectionable flavor and other undesired changes. For example, as is well known, the simple heating of milk to a temperature required for sterilization (in the neighborhood of 280°–300° F.) causes caramelization and other changes resulting in a decided cooked flavor and off color.

It is the principal object of the present invention to provide a novel method for sterilizing perishable materials, particularly edible materials.

It is another object of the present invention to provide a novel method of sterilizing edible materials wherein disadvantages of prior sterilization techniques are not encountered.

Still another object of the present invention is to provide a novel method for sterilizing perishable liquids, without reliance upon the use of chemicals, wherein the resulting product, although completely sterile, is otherwise not detectably altered in desirable characteristics from the original, unsterilized, liquid.

A further object of the present invention is to provide a novel method for sterilizing perishable liquids whereby such liquids may be quickly and easily sterilized without altering, beyond destruction of microorganisms therein, the chemical nature of the liquid to any detectable extent.

A specific object of the present invention is to provide a method for sterilizing edible liquids without producing objectionable flavor or appearance therein.

A further principal object of the present invention is to provide a novel apparatus for sterilizing perishable materials whereby the foregoing objects may be realized.

Other objects will become apparent from a consideration of the following specification and the claims.

The method of the present invention comprises subjecting the material to be sterilized, while in a confined zone boundaries of which are permeable to infrared radiation, to infrared radiation through an atmosphere of steam under superatmospheric steam pressure, said steam being in direct contact with said boundaries of said zone but out of direct contact with said material undergoing treatment, until said material is sterilized, and then removing said material from said zone to a zone of lower temperature and substantially devoid of infrared radiation.

The novel apparatus of the present invention comprises a pressure chamber with means to admit steam under superatmospheric pressure thereinto, means for moving a sterilizable material within a confined path within said pressure chamber which means includes a wall permeable to infrared radiation, infrared radiation means spaced from said infrared-permeable wall and adapted to direct infrared radiation through said wall into said confined path, means for admitting sterilizable material to one end of said confined path and means for removing the material from the other end of said confined path to a confined path outside said pressure chamber.

The present invention will be more readily understood from a consideration of the drawings in which:

FIGURE 1 is a side elevational schematic view, partly in section, of one form of apparatus according to the present invention;

FIGURE 2 is an end sectional view of apparatus shown in FIGURE 1 as seen from line 2—2; and FIGURE 3 is an enlarged side elevational view, partly in section, of the confined liquid flow path shown in FIGURE 1.

It has been found that the conjoint use of infrared radiation and steam under pressure produces outstanding and unusual results in the sterilization of perishable materials. Stated briefly, the present invention permits the sterilization of such materials without inducing deleterious changes therein which would normally be objectionable, such as off-color, off-taste, and the like. For example, raw, whole, homogenized milk treated according to the present invention and aseptically canned in sterile containers has, after incubation at 98° F. for thirty days, been found to have a bacteria count of zero and yet have the appearance and flavor of fresh, pasteurized, homogenized, whole milk; and a vitamin content, protein content and pH substantially unaltered from those of the original untreated raw milk. Likewise, raw orange juice, after treatment by the present invention and filled aseptically into sterile bottles and sealed, and incubated at 98° F. for thirty days, was found to have a bacteria count of zero, a taste like pure fresh orange juice, and a vitamin C content and pH the same as those of the original juice. Similar results have also been obtained with fresh corn kernels treated by the present process. Probably the principal reasons for the success of the invention are that the highest temperature which the material reaches during the treatment is substantially less than heretofore required, and that at no time does the material contact a surface or localized area of extremely high temperature ("hot spots").

The use of either infrared radiation or of steam alone does not approach the advantageous results obtained through the conjoint use of infrared radiation and steam. Infrared radiation penetrates the material undergoing treatment, thus heating the body of material internally by radiation rather than by simple conduction. Of course, the infrared-permeable walls of the confined path in which the material is positioned during treatment become heated, and the heat imparted to the walls would normally raise them to a high temperature resulting in further heating of the material moving adjacent them by conduction. Thus, the use of infrared radiation, or other source of heat, alone has been found to result in local overheating of the material and, hence, objectionable alteration. However, the atmosphere of steam which is, in accordance with the present invention, in direct contact with the outside of the walls of the confined flow path and through which the infrared radiation must travel before penetrating the walls and the material undergoing treatment, serves to prevent overheating of the walls and to more evenly distribute uniform temperatures throughout the walls of the flow path. The net result is the subjection of the material to intense infrared radiation sufficient to raise its temperature substantially uniformly throughout its mass to a substantial degree without at the same time subjecting the material to overly heated wall surfaces. At the moderately elevated temperatures which all parts of the material reach, the radiation destroys microorganisms therein. The steam serves, by direct contact with the walls of the confined flow path, as a high temperature "cooling" medium to equalize temperatures and to prevent hot spots, and also possibly serves to filter or absorb some of the radiation. At any rate the infrared radiation and steam coact synergistically to produce a result not heretofore obtainable with either alone, or as far as is known, by any means.

Referring then to the drawings, in FIGURE 1 is illustrated one form of apparatus which may be employed in accordance with the present invention. Numeral 1 represents a pressure chamber 1 which may be constructed to withstand steam pressures of at least 40 p.s.i. gauge. Steam under pressure may be admitted to pressure chamber 1 through valved-conduit 2, while purging gases may be vented from chamber 1 through valved-conduit 3. The valves employed may be conventionally constructed to control the steam pressure within chamber 1 at a predetermined level. Pressures between about 10 and about 20 p.s.i gauge, may be employed, with a preferred pressure being about 15 p.s.i. A conventional steam pressure gauge 4 notes the pressure within chamber 1. A conventional steam trap 24 is provided for removing excess water from pressure chamber 1. The liquid to be sterilized is pumped into a confined path located within pressure chamber 1, the walls of the path being permeable to infrared radiation. Such a path is illustrated as conduit or tube 5 which may be made of conventional heat- and pressure-resisting transparent glass like those of the borosilicate type commercially available. In this connection, the tube should be capable of resisting temperatures of 300° F. and pressures of 40 p.s.i. gauge. Tube 5 will be described more in detail in connection with FIGURE 3. Tube 5 may be connected by conventional flanged connections to entrance conduit 6 and to exit conduit 7.

Spaced radially from tube 5 and adapted and arranged to direct infrared radiation directly toward tube 5, are infrared radiation means, such as infrared lamps 8. Instead of lamps of the type shown, infrared-generating tubes may be employed. Preferably, the infrared radiation means are adapted to direct the radiation radially toward tube 5 from a plurality of substantially uniformly angularly spaced directions so that the liquid is irradiated from all sides. In this connection, the embodiment illustrated in FIGURES 1 and 2, shows a plurality of banks of infrared lamps arranged at radial angles of 90° apart around tube 5. This is particularly illustrated in FIGURE 2.

The liquid undergoing treatment within tube 5 becomes heated to a temperature above the boiling point of water, and, since it is a water-based liquid, a steam pressure commensurate with the temperature of the liquid in the tube will be reached. The liquid, therefore, is forced into tube 5 by means of a pump 9.

A check valve 10 is located in entrance conduit 6 to prevent the liquid from backing up into the system and a check valve 11 is located in exit conduit 7 to hold the liquid in tube 5 until forced through check valve 11 by means of pump 9.

Upon leaving tube 5 and pressure chamber 10 the treated liquid, in flowing throught exit conduit 7, is in a zone having a lower temperature than that which existed in tube 5 within chamber 1 and which is, of course, at least substantially devoid of infrared radiation. The hot liquid may be aseptically filled, under pressure, into sterile metal containers and sealed aseptically, or it may be cooled somewhat, such as to below 212° F., or even chilled, and filled aseptically into other types of sterile containers, such as glass bottles, paperboard containers, and the like, and aseptically sealed.

In FIGURE 3 is an enlarged view, partly in section, of tube 5, showing more in detail its structure as well as means for connecting it to entrance conduit 6 and exit conduit 7. Flanges 12 and 13, respectively, are located at each end of tube 5, and these may be connected, as by conventional bolts 14 to corresponding flanges 15 and 16, respectively, on the entrance tube 6 and on the exit tube 7, respectively. Gaskets 17 of a synthetic rubber, like polychloroprene, may be employed to seal the junctures between the respective flanges.

Also shown in FIGURE 1, but not a necessary part of the apparatus or method of the present invention, is a preheater 20 through the immersed coil 21 of which the liquid to be sterilized is pumped before being subjected to the sterilization step proper in tube 5. A suitable heating medium, like steam or hot water, may be admitted to preheater 20 through valved conduit 22, the heating medium being removed as through valved conduit 23. Preheater 20 simply serves to raise the temperature of the liquid somewhat before the sterilization step proper, but it will be realized that the cold liquid may be admitted directly to the sterilizing unit where all of the heating can take place. One advantage of preheater 20 is that it permits reduction in the size of the sterilizing unit.

While the drawings illustrate a single tube, it will be apparent that a plurality of tubes may be present in a single pressure chamber. Likewise, while the drawings illustrate a single pressure chamber, it will also be obvious that a plurality of pressure chambers may be employed. For example, a plurality of sterilizing units may be arranged on a rotatable table on which at one station, a sterilizing unit is filled with the liquid, the unit then being moved during the course of treatment to a final station at which the liquid is removed from the sterilizing unit.

In addition, when treating solids, like corn kernels, diced vegetables, and the like, or liquids containing a high content of solids, like certain soups and stews, means other than pumping, such as a screw conveyor, may be employed to move the material undergoing treatment.

The precise time of treatment will depend upon the ultimate temperature to be reached by the particular material undergoing treatment as well as upon the size of the tube through which the material is moved, the intensity of the infrared radiation, the temperature of the steam, the temperature of the incoming material and other variable factors which control the flow of heat and the heating of a liquid from one temperature to another. It is not possible to state a range of temperatures and times which will be applicable for all materials and for all embodiments of apparatus design. In most cases, the ultimate temperature reached during treatment will be above 212° F. but substantially below that temperature which, by heating alone, is required for sterilization of the particular material. For example prior high temperature short time (HTST) procedures relying upon heat alone such as steam injection for the sterilization of milk, have required from one to two or more sequential treatments at 280°–300° F. with treatment exposure times ranging from about 10 seconds for the higher temperature up to about 60 seconds for the lower temperature, resulting in off flavor; whereas, in the sterilization of milk in accordance with the present invention, wherein changes in flavor are avoided, the ultimate temperature reached during treatment is in the neighborhood of 245–250° F. In any event, the ultimate temperature reached during the present treatment will be that resulting in sterilization of the particular material, and this can readily be determined by routine conventional bacteria count tests. In other words, the end point of treatment according to the present invention is the reduction of the bacteria count substantially to zero, and this may require or permit the material to remain at the ultimate temperature reached for a few seconds just prior to removal from the treatment zone or at least prior to removal to a cooler zone.

As stated, the present invention is applicable to the sterilization of perishable materials, that is materials which are subject to deleterious change by enzymatic or bacterial action. The material will have an aqueous base and will be thermolabile in that it will be subject to deleterious change at high temperatures. In most cases the material will be edible. Examples of such materials are milk (whole milk, homogenized whole milk, skimmed milk, concentrated milk, and the like milk products); fruit juices (including fruit juice concentrates); beer; and other manufactured beverages, like "soft" drinks; soups; grains, like corn; diced vegetables; fruit pieces; and the like.

The invention will be more readily understood from a consideration of the following examples which are given for the purpose of illustration only and are intended to limit the scope of the invention in any way.

Example I

Raw, fresh, whole, homogenized cow's milk having a pH of 6.4 and quickly preheated to 170° F. (in about 6–8 seconds) is admitted to a two-inch I.D. tube made of high temperature- and pressure-resistant borosilicate glass. The tube is positioned in a pressure vessel. Within the pressure vessel and spaced around the tube (two inches from the outside of the tube) are 375-watt infrared lamps. Four such lamps (spaced radially about the tube 90° apart) are positioned every five inches of tube length to provide one-thousand watts of infrared radiation for each five inches of tube length. The pressure vessel is filled with steam under 15 pounds per square inch gauge pressure. In 2½ minutes time, the milk reaches a temperature of 245° F. whereupon it is removed from the tube and, after slight bleeding of vapors from the milk, the milk is filled aseptically into sterile metal cans and the cans aseptically sealed. The sealed cans are then cooled and then incubated (98° F.) for a continuous period of 30 days. After the 30-day incubation period, cans are opened, tasted and tested. The milk had the appearance of and tasted like fresh pasteurized homogenized milk and had a pH of 6.32. All conventional bacteria tests on the milk gave a bacteria count of 0, and there was no significant change in the vitamin or protein content of the milk from those of the initial raw milk.

When the same type of milk was heated by the infrared lamps alone, without steam in the pressure vessel, after it had reached 245° F. the milk was discolored and had a strong cooked flavor. When the same type of milk was heated with steam under pressure alone in the sterilizing unit, without the infrared radiation, it had reached 220° F. in 2½ minutes and by that time had a pronounced cooked flavor.

Example II

Raw, fresh orange juice, which had been quickly preheated to 170° F. (in about six seconds) was admitted to the sterilizer as in Example I. After a period of 45 seconds it reached a temperature of 220° F. whereupon it was removed from the tube and filled aseptically into sterile glass bottles which were then sealed. The sealed bottles were chilled and then incubated (98° F.) for thirty days. After the thirty-day incubation period bottles of the treated juice were opened, tasted and tested. The juice tasted like pure fresh orange juice, had a pH the same as the original juice, had a bacteria count of 0 and had a vitamin C content the same as that of the original raw juice.

Considerable modification is possible in the selection of precise conditions and apparatus design without departing from the scope of the invention.

I claim:

1. The method which comprises subjecting an edible perishable material having an aqueous base, while in a confined zone boundaries of which are permeable to infrared radiation, to infrared radiation through an atmosphere of steam under superatmospheric steam pressure, said steam being in direct contact with said boundaries of said zone but out of direct contact with said material undergoing treatment, until said material is sterilized, and then removing said material from said zone to a zone of lower temperature and substantially devoid of infrared radiation.

2. The method of claim 1 wherein the temperature to which the material is heated is above 212° F. but substantially below that required for sterilization of that material by the use of heat alone, and wherein said steam is at a pressure between about 10 and about 20 pounds per square inch (gauge).

3. The method of claim 1 wherein the material upon removal from said first-mentioned zone, is filled aseptically under pressure, into a sterile container and the containers sealed.

4. The method of claim 1 wherein the material after removal from said zone is cooled to a temperature below 212° F. and filled aseptically into a sterile container and the container sealed.

5. The method of claim 1 wherein said material comprises an edible liquid.

6. The method which comprises subjecting an edible perishable material having an aqueous base, while in a confined zone boundaries of which are permeable to infrared radiation, to infrared radiation through an atmosphere of steam under superatmospheric steam pressure, said steam being in direct contact with said boundaries of said zone but out of direct contact with said material undergoing treatment, until said material has absorbed infrared radiation in an amount and has attained a temperature, each of which by itself is insufficient to sterilize said material, at which the bacteria count of said material has been reduced substantially to zero, and then removing said material from said zone to a zone of lower temperature and substantially devoid of infrared radiation.

7. The method of claim 6 wherein said material comprises an edible liquid.

8. The method which comprises subjecting milk, while in a confined zone boundaries of which are permeable to infrared radiation, to infrared radiation through an atmosphere of steam under superatmospheric steam pressure, said steam being in direct contact with said boundaries of said zone but out of direct contact with said milk, until said milk is heated to a temperature in the neighborhood of 245°–250° F., and then removing said milk from said zone to a zone of lower temperature and substantially devoid of infrared radiation.

9. The method of claim 8 wherein said milk is preheated to a temperature in the neighborhood of 170° F. before being admitted to said first-mentioned zone.

10. The method of claim 9 wherein said milk is heated in said first-mentioned zone from said temperature in the neighborhood of 170° F. to said temperature in the neighborhood of 245°–250° F. in about 2½ minutes.

11. The method which comprises subjecting milk, while in a confined zone boundaries of which are permeable to infrared radiation, to infrared radiation through an atmosphere of steam under superatmospheric steam pressure, said steam being in direct contact with said boundaries of said zone but out of direct contact with said milk, until said milk is heated to a temperature in the neighborhood of 245°–250° F., and then removing said milk from said zone to a zone of lower temperature and substantially devoid of infrared radiation while permitting vapors associated with said milk to escape from said milk.

12. The method of claim 11 wherein said steam is at a pressure of about 15 pounds per square inch (gauge).

13. The method which comprises subjecting a fruit juice, while in a confined zone boundaries of which are permeable to infrared radiation, to infrared radiation through an atmosphere of steam under superatmospheric steam pressure, said steam being in direct contact with said boundaries of said zone but out of direct contact with said juice, until the bacteria count in said juice is reduced substantially to zero, and then removing said juice from said zone to a zone of lower temperature and substantially devoid of infrared radiation.

14. A method of claim 13 wherein said juice is orange juice, and wherein the temperature to which said juice is heated in the neighborhood of 220°–225° F.

15. The method of claim 14 wherein said orange juice is preheated to a temperature in the neighborhood of 170° F. before being admitted to said first-mentioned zone.

16. The method of claim 15 wherein said juice is heated from said temperature in the neighborhood of 170° F. to said temperature in the neighborhood of 220°–225° F. in approximately 45 seconds.

17. Apparatus for sterilizing edible perishable materials which comprises a pressure chamber with means to admit steam under superatmospheric pressure thereinto, means for moving a perishable material within a confined path within said pressure chamber which means includes a wall permeable to infrared radiation, infrared radiation means spaced from said infrared-permeable wall and adapted to direct infrared radiation through said wall into said confined path, means for admitting perishable material to one end of said confined path and means for removing said material from the other end of said confined path to a confined path outside said pressure chamber.

18. Apparatus for sterilizing edible liquids which comprises a pressure chamber with means to admit steam under superatmospheric pressure thereinto, at least one conduit permeable to infrared radiation within said pressure chamber, means for admitting liquid under pressure to said conduit and means for withdrawing liquid under pressure from said conduit, infrared radiation means spaced from said conduit and adapted to direct infrared radiation through the walls thereof.

19. Apparatus for sterilizing edible liquids which comprises a pressure chamber with means to admit steam under superatmospheric pressure thereinto, at least one tube permeable to infrared radiation within said pressure chamber, means to admit liquid to one end of said tube from outside of said chamber and means for removing liquid from the other end of said tube to beyond said chamber, infrared radiation means spaced radially from said tube and adapted to direct infrared radiation radially toward said tube conduit from different directions.

20. Apparatus for sterilizing edible liquids which comprises a pressure chamber with means to admit steam under superatmospheric pressure thereinto, at least one tube permeable to infrared radiation within said pressure chamber, means for admitting liquid under pressure to one end of said tube from outside said chamber and means for withdrawing liquid under pressure from the other end of said tube to beyond said chamber, infrared radiation means spaced radially from said tube and adapted to direct infrared radiation radially toward said tube from a plurality of substantially uniformly angularly-spaced directions.

21. Apparatus for sterilizing milk which comprises a pressure chamber with means to admit steam under superatmospheric pressure thereinto, at least one conduit permeable to infrared radiation within said pressure chamber, means to admit milk to one end of said conduit and means for removing milk from the other end of said conduit to beyond said chamber, infrared radiation means spaced radially from said conduit and adapted to direct infrared radiation radially toward said conduit and adapted, in conjunction with the steam pressure within said chamber and the rate of flow of milk within said conduit, to heat said milk in said conduit to a temperature in the neighborhood of 245°–250° F. at the downstream end of said conduit.

References Cited in the file of this patent

UNITED STATES PATENTS

| | | |
|---|---|---|
| 2,623,736 | Hytte | Dec. 30, 1952 |
| 2,885,294 | Larson et al. | May 5, 1959 |

UNITED STATES PATENT OFFICE
CERTIFICATE OF CORRECTION

Patent No. 3,092,503                                June 4, 1963

Oscar S. Gray

It is hereby certified that error appears in the above numbered patent requiring correction and that the said Letters Patent should read as corrected below.

Column 5, line 14, after "are" insert -- not --.

Signed and sealed this 24th day of December 1963.

(SEAL)
Attest:
ERNEST W. SWIDER
Attesting Officer

EDWIN L. REYNOLDS
Acting Commissioner of Patents